United States Patent
Koike et al.

(10) Patent No.: US 8,306,307 B2
(45) Date of Patent: Nov. 6, 2012

(54) COMPONENT ASSEMBLY INSPECTION METHOD AND COMPONENT ASSEMBLY INSPECTION APPARATUS

(75) Inventors: Naoki Koike, Ebina (JP); Kimihiro Wakabayashi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 651 days.

(21) Appl. No.: 12/536,938

(22) Filed: Aug. 6, 2009

(65) Prior Publication Data

US 2010/0246894 A1     Sep. 30, 2010

(30) Foreign Application Priority Data

Mar. 25, 2009   (JP) .................. 2009-074336

(51) Int. Cl.
*G06K 9/00*   (2006.01)
*G01C 19/00*   (2006.01)
*G01C 25/00*   (2006.01)
*G01D 18/00*   (2006.01)
*G01F 25/00*   (2006.01)
*G06F 19/00*   (2011.01)

(52) U.S. Cl. ........................ 382/141; 702/104
(58) Field of Classification Search .............. None
See application file for complete search history.

(56) References Cited

U.S. PATENT DOCUMENTS 6,286,202 B1 * 9/2001 Asai et al. .................. 29/740
2001/0021898 A1 * 9/2001 Greer et al. ................ 702/104

FOREIGN PATENT DOCUMENTS

JP   05-145295   6/1993
JP   2000-013097   1/2000

OTHER PUBLICATIONS

NPL_Loser, Automated part positioning with the laser tracker, S. Kyle, R.Ioser, D. Warren Leica, downloaded from http://epics.aps.anl.gov/News/Conferences/1997/iwaa/papers/loser.pdf on Apr. 13, 2012, 9 pages.*

* cited by examiner

*Primary Examiner* — Paul Danneman
(74) *Attorney, Agent, or Firm* — Morgan, Lewis & Bockius LLP

(57) ABSTRACT

A component assembly inspection method includes taking an image of a first light spot group possessed by a first component with a camera after the first component is assembled in a second component, the first light spot group including plural light spots. The method further includes recognizing a position and an attitude of the first component based on a light image that is on the image taken with the camera and represents each of the light spots of the first light spot group; and determining quality of an assembly state of the first component in the second component based on the position and attitude of the first component.

11 Claims, 8 Drawing Sheets

COMPONENT ASSEMBLY INSPECTION METHOD AND COMPONENT ASSEMBLY INSPECTION APPARATUS

CROSS-REFERENCE TO RELATED APPLICATION

This application is based on and claims priority under 35 USC 119 from Japanese Patent Application No. 2009-074336, filed Mar. 25, 2009.

BACKGROUND (i) Technical Field

The present invention relates to a component assembly inspection method and a component assembly inspection apparatus.

(ii) Related Art

Conventionally, there is well known an inspection apparatus that inspects quality of a mounting state of a component on a board after the component is mounted on the board.

SUMMARY

According to an aspect of the invention, there is provided a component assembly inspection method including:

taking an image of a first light spot group possessed by a first component with a camera after the first component is assembled in a second component, the first light spot group including plural light spots;

recognizing a position and an attitude of the first component based on a light image that is on the image taken with the camera and represents each of the light spots of the first light spot group; and determining quality of an assembly state of the first component in the second component based on the position and attitude of the first component.

BRIEF DESCRIPTION OF THE DRAWINGS

Exemplary embodiments of the present invention will be described in detail based on the following figures, wherein.

DETAILED DESCRIPTION

Exemplary embodiments of the invention will be described below with reference to the drawings.

A conventional component assembly inspection method will be described as a comparative example, and then various exemplary embodiments of the invention will be described.

FIGS. 1A through 2B are explanatory views illustrating an example of the conventional component assembly inspection method.

Figure 1A:
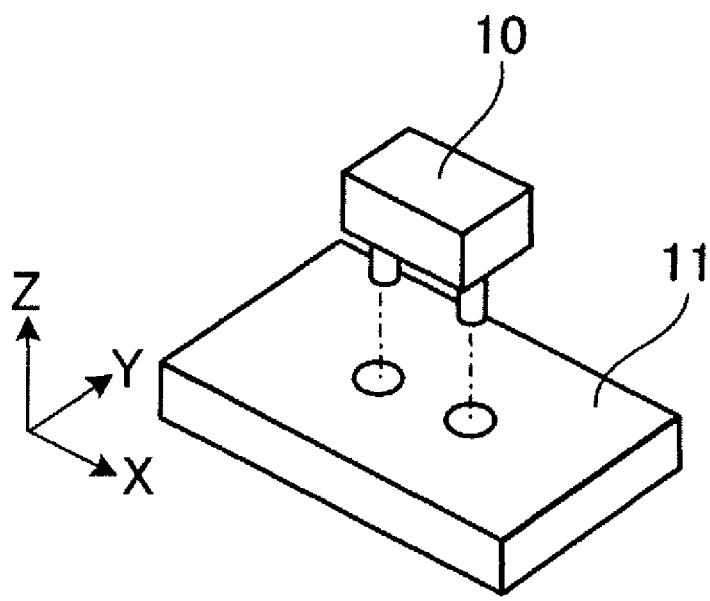
FIGS. 1A and 1B are explanatory views illustrating an example of the conventional component assembly inspection method.
Figure 1B:
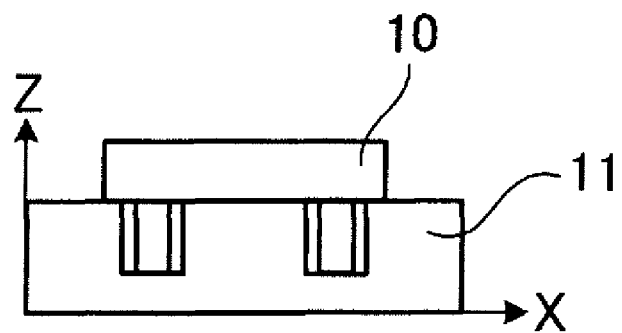
Figure 2B:
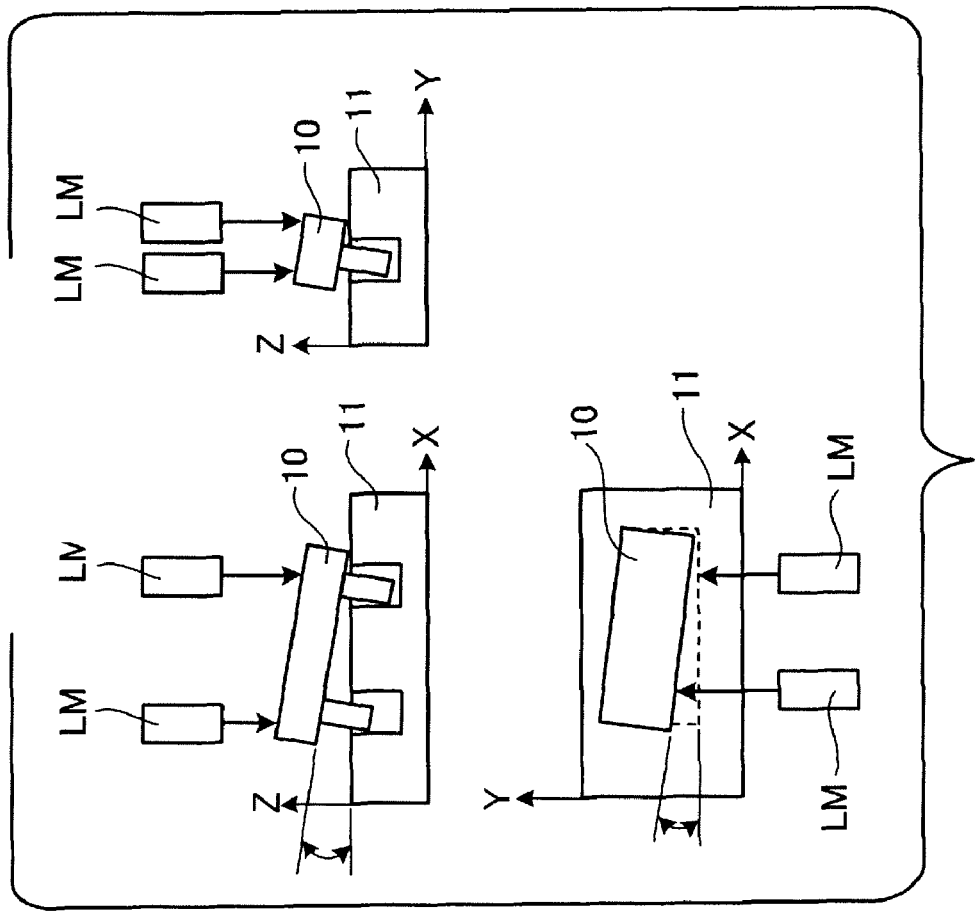
FIGS. 2A and 2B are explanatory views illustrating the example of the conventional component assembly inspection method.
Figure 2A:
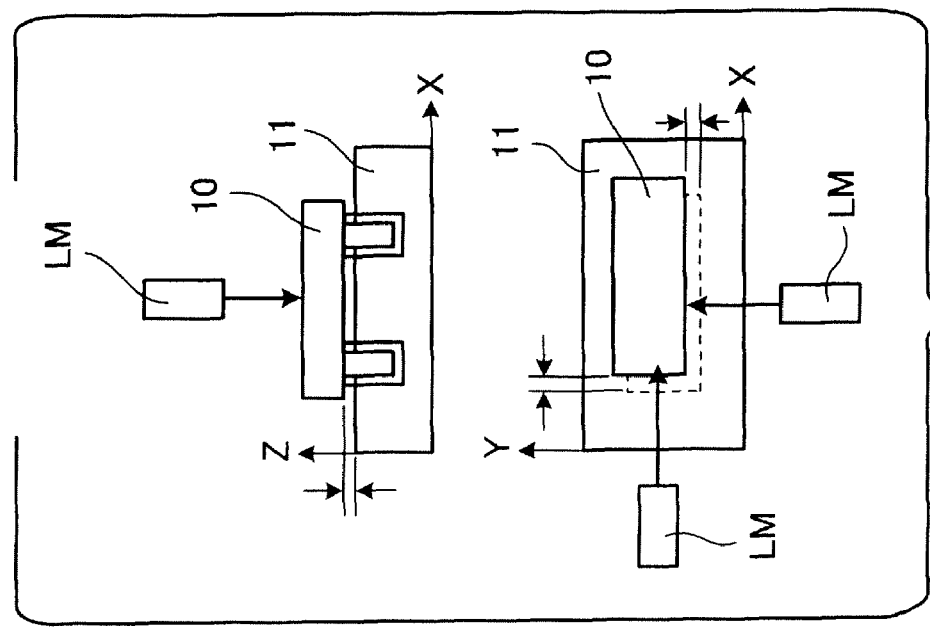

FIG. 1A illustrates a state before a first component 10 is assembled in a second component 11 fixed to a predetermined position, and FIG. 1B illustrates a state after the first component 10 is assembled in the second component 11. FIGS. 2A and 2B illustrate how many inspection points are required to inspect whether the first component 10 is correctly assembled in the second component 11. As illustrated in FIG. 2A, each one inspection point is required in X-axis, Y-axis, Z-axis directions when there is only a possibility that the first component 10 is translated in X- and Y-directions with respect to the second component 11. On the other hand, as illustrated in FIG. 2B, many inspection points are required in X-axis, Y-axis, Z-axis directions to inspect whether the first component 10 is obliquely assembled with respect to the second component 11.

Conventionally, after the first component 10 is assembled in the second component 11 to go into the state of FIG. 1B, the position of each inspection point of FIG. 2B is measured with a laser displacement meter LM or a contact displacement sensor, thereby determining quality of assembly of the first component 10 in the second component 11.

Therefore, when the inspection point is inspected with one laser displacement meter LM, it is necessary to sequentially inspect the inspection points, which causes a problem in that a long time is required to make the inspection. When the number of laser displacement meters LM is increased to shorten the inspection time, facilities are enlarged, which also is a problem.

In view of the comparative example described above, various embodiments of the invention will be now described.

Figure 3:
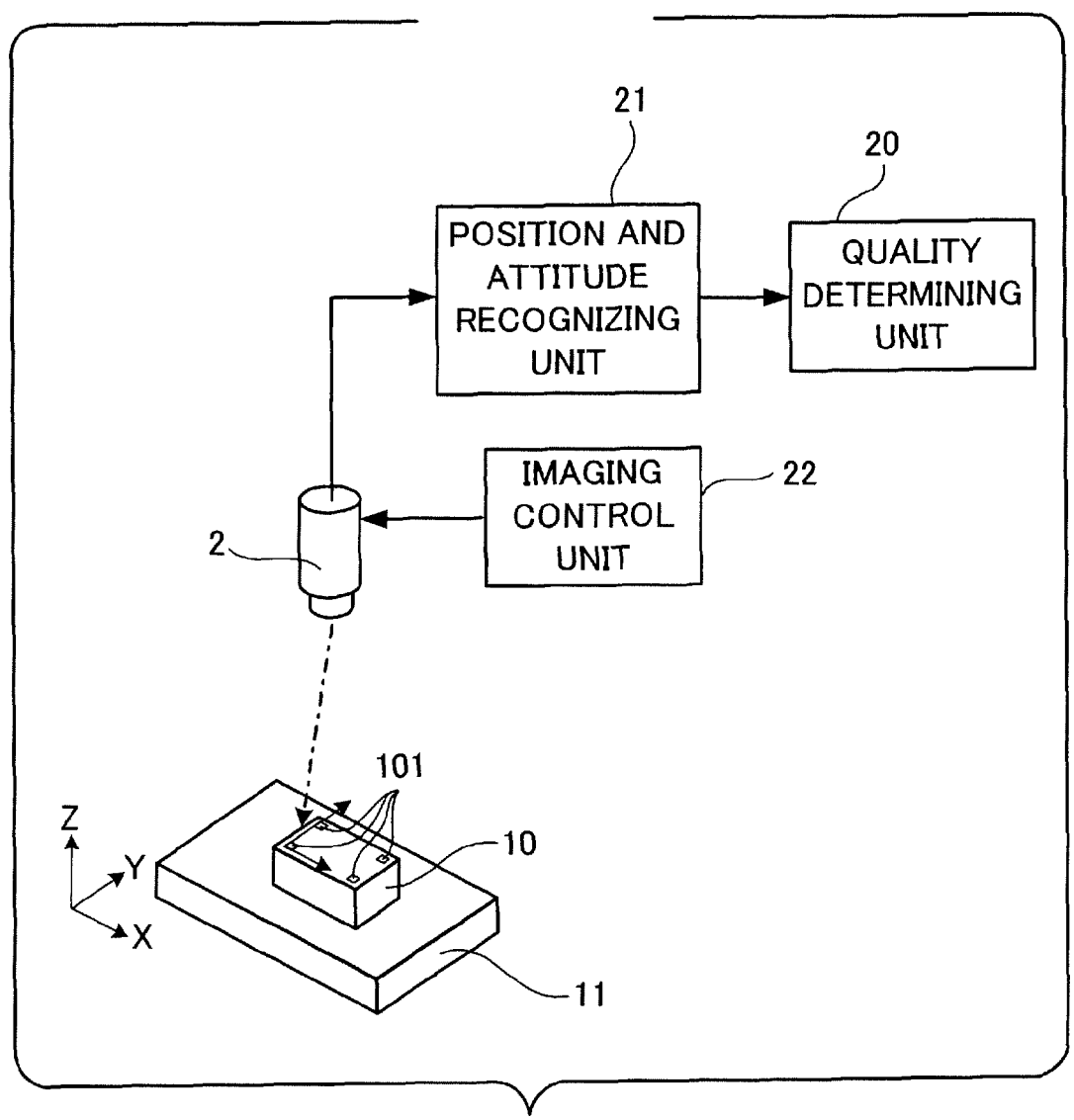
FIG. 3 is an explanatory view of a first exemplary embodiment.

FIGS. 3 to 5 are explanatory views of a first exemplary embodiment.

Figure 4A:
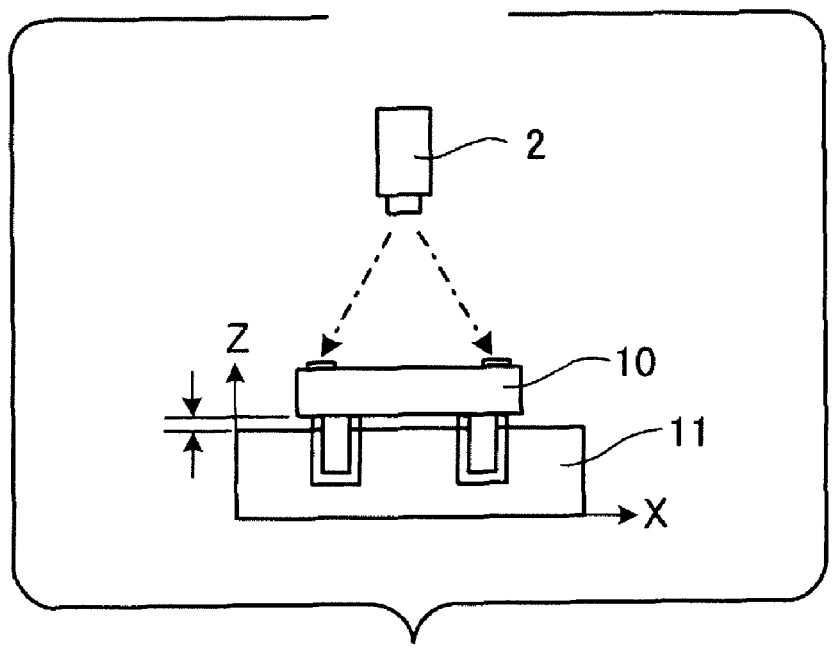
FIG. 4 is an explanatory view of the first exemplary embodiment.
Figure 4B:
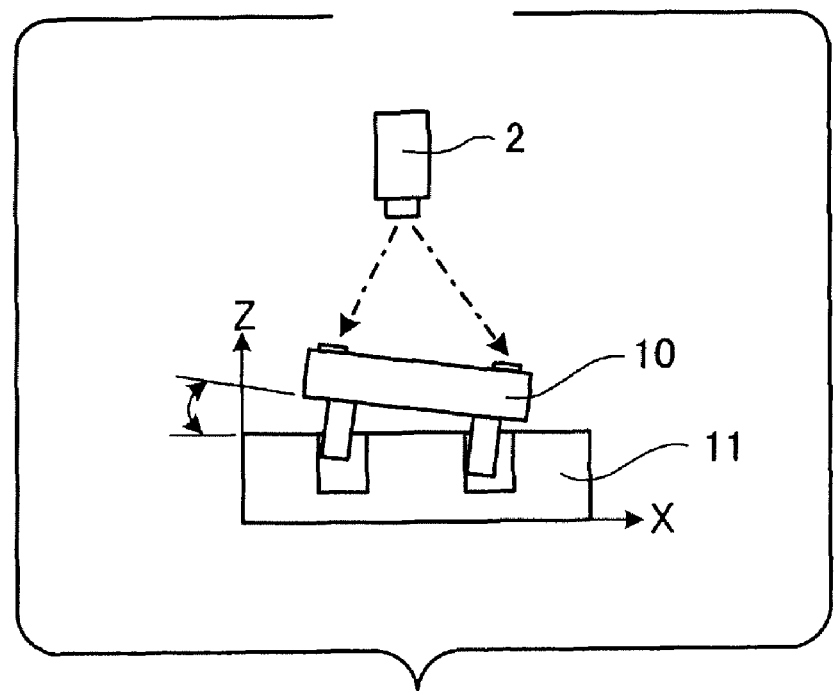
Figure 5A:
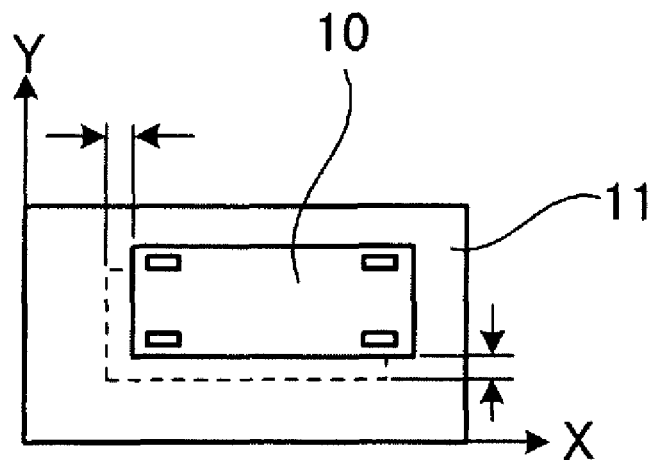
FIG. 5 is an explanatory view of the first exemplary embodiment.
Figure 5B:
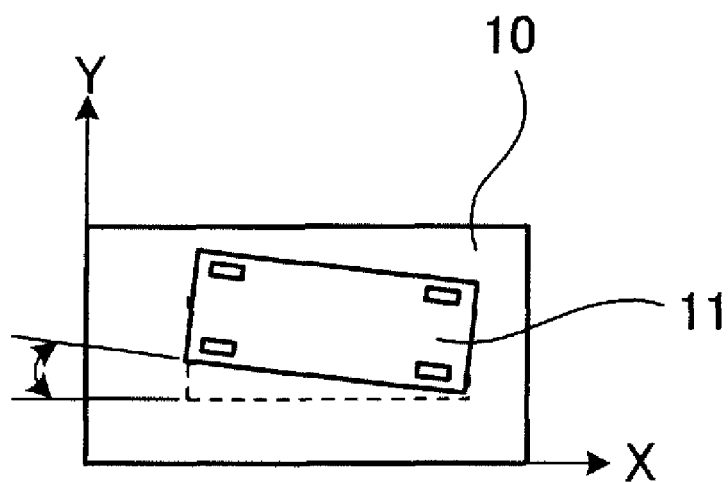

FIG. 3 is a perspective view illustrating a state after a first component 10 is assembled in a second component 11, FIGS. 4A and 4B are side views illustrating the state after the first component 10 is assembled in the second component 11, and FIGS. 5A and 5B are plan views illustrating the state after first component 10 is assembled in the second component 11.

As illustrated in FIGS. 3 through 4B, a camera 2 is fixed above the first component 10. An imaging control unit 22 controls an imaging operation of the camera 2. For example, the imaging control unit 22 includes a computer and a control program executed by the computer.

Plural (four in this case) LEDs 101 are disposed on and fixed to a top surface of the first component 10. The four LEDs correspond to an example of the first light spot group of the invention. Under the control of the imaging control unit 22, images of the three LEDs 101 are taken, the images are fed into a position and attitude recognizing unit 21, and the position and attitude recognizing unit 21 performs operation to obtain a direction viewed from the camera 2 and a distance from the camera 2 for each of the three LEDs 101. So long as the three LEDs 101 are disposed while separated from one another, the position and attitude recognizing unit 21 obtains a position and an attitude of a triangular plane having vertexes of the three LEDs 101 from the directions and distances of the three LEDs 101, and the position and attitude recognizing unit 21 recognizes a three-dimensional position of each of the three LEDs 101, thereby recognizing the position and attitude of a triangular plane. Hereinafter the triangular plane is referred to as reference plane. In the exemplary embodiment of FIGS. 3 through 4B, in addition to the LEDs 101 located at vertexes of the triangle, another LED 101 is used to improve accuracy of the position and attitude operation performed by the position and attitude recognizing unit 21. Another LED 101 may be disposed at a position differentiated per LED board, so that this LED 101 can have an ID (Identification) function of distinguishing the LED board from other LED boards to identify this LED board.

As described above, because LED 101 is fixed to the predetermined position of the first component 11, the position and attitude recognizing unit 21 recognizes the position and attitude of the first component 10 based on the information on the three-dimensional position of LED 101. As with the imaging control unit 22, the position and attitude recognizing unit 21 includes a computer and a position and attitude recognizing program executed by the computer. The computer may be shared by the position and attitude recognizing unit 21 and the imaging control unit 22. A quality determining unit 20, which will be described later, may also include a computer and a quality determining program executed by the computer. The computer may be shared by the position and attitude recognizing unit 21 and the imaging control unit 22.

A measuring method based on the image taken with the camera 2 is basically as follows. The positions and attitudes of the camera 2 and second component 11 are well known, an image of each LED 101 on the top surface of the first component 10 is taken with the camera 2, and the directions of the LEDs 101 are obtained when the positions of the images of LEDs 101 are viewed from the camera 2. The directions of the LEDs 101 viewed from the camera 2 are obtained because a relative positional relationship among LEDs 101 is previously known. The plane defined by the LEDs 101, that is, the position and attitude of the LED board are obtained from these pieces of information.

Alternatively, there may be employed the size of an image of each LED 101 obtained using the camera 2 on which an imaging lens having a large spherical aberration is mounted. When the camera 2 mounted with an imaging lens having a large spherical aberration is used, the image of each LED 101 becomes a blurred image in a substantially elliptical shape. Besides this, the size of the image varies depending on a distance from the camera 2 to each LED 101. With this phenomenon, the distance from the camera 2 to each LED 101 is obtained based on the size of the image of LED 101. When the directions and distances of three LEDs 101 are obtained, the three-dimensional positions of LEDs 101 are obtained, and the plane defined by these three LEDs 101 is obtained, that is, the position and attitude on the top surface of the first component 10 are obtained. The two conventional measuring methods described above may be used at the same time.

As described above, in the first exemplary embodiment, four LEDs 101 are provided to improve the accuracy of position and attitude operation performed by the position and attitude recognizing unit 21. When the three-dimensional position of each LED 101 is obtained, the position and attitude of the first component 10 are obtained.

The pieces of information on the position and attitude of the first component 10 are fed into the quality determining unit 20. The quality determining unit 20 previously learns the position and attitude of the second component 11, and determines whether the first component 10 has the correct position and attitude with respect to the second component 11.

When the position and attitude of the first component 10 are obtained, the position and attitude recognizing unit 21 exactly computes the position and attitude of the reference plane defined by three LEDs 101 to recognize the position and attitude of the first component 10, even if the first component 10 is inclined in the Z-direction due to assembly failure as illustrated in FIG. 4B, or even if the first component 10 is inclined in the Y-direction due to assembly failure as illustrated in FIG. 5B. The quality determining unit 20 determines the quality of the assembly state of the first component 10 in the second component 11 based on the computation result of the position and attitude recognizing unit 21.

In the exemplary embodiment, the combination of the imaging control unit 22, the position and attitude recognizing unit 21, the quality determining unit 20, and the camera 2 is an example of the component assembly inspection apparatus of the invention.

The imaging process performed using the camera 2 by the imaging control unit 22 corresponds to the taking an image of the invention. The process for computing the position and attitude of the first component 10, performed by the position and attitude recognizing unit 21 based on the taken image, corresponds to the recognizing of the invention. The process for determining the quality of the assembly state of the first component 10 in the second component 11, performed by the quality determining unit 20 based on the computation result of the position and attitude recognizing unit 21, corresponds to the determining of the invention.

In the first exemplary embodiment, a battery is mounted on the first component 10 to light the LEDs 101, and the battery supplies electric power to the LEDs 101. Alternatively, a coil or an antenna is mounted on the first component 10, and the electric power may be supplied from the outside by electromagnetic induction or radio wave to light the LEDs 101. In the latter case, there is no need to mount an expendable battery on the first component 10, thereby improving maintenance reliability.

A corner cube that is a kind of retroreflector may be used in place of the LED 101 of the first exemplary embodiment. The retroreflector has a characteristic that allows light incident on the retroreflector to be reflected to proceed opposite to the incident direction. When disposed in place of the four LEDs 101, the corner cubes are illuminated with light in a direction from the camera 2, and the light reflected from the corner cubes is received by the camera 2. In this case, the measurement equal to that of LED 101 can be performed and besides this, no electric power is required for the corner cube, thereby improving the maintenance reliability. Alternatively, instead of the corner cube, a sticker having a retroreflecting property may be adhered to the first component 10, or the first component 10 may be coated with paint having a retroreflecting property.

Thus, the component assembly inspection method and the component assembly inspection apparatus, which can correctly determine the quality of the assembly state of the first component in the second component, are realized in the first exemplary embodiment.

Various exemplary embodiments that are different from the first exemplary embodiment will be described below.

In the first exemplary embodiment, the second component is previously fixed to the predetermined position. However, the second component maybe fixed to a component support while being conveyed by a conveyer. In such a case, the second component is not fixed to the predetermined position.

Figure 6A:
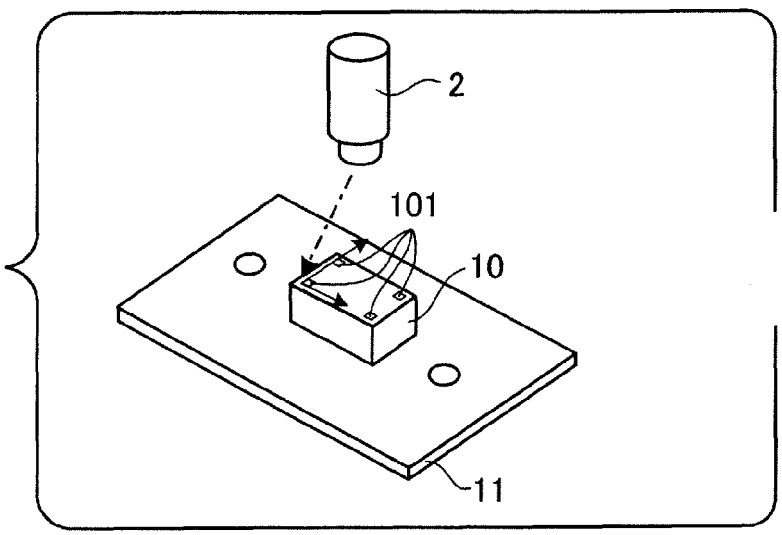
FIGS. 6A to 6C are explanatory views of various exemplary embodiments.
Figure 6B:
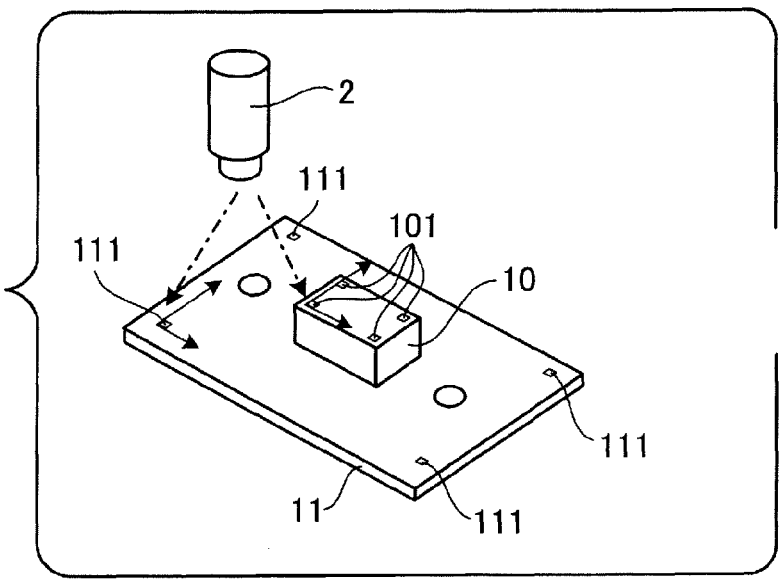
Figure 6C:
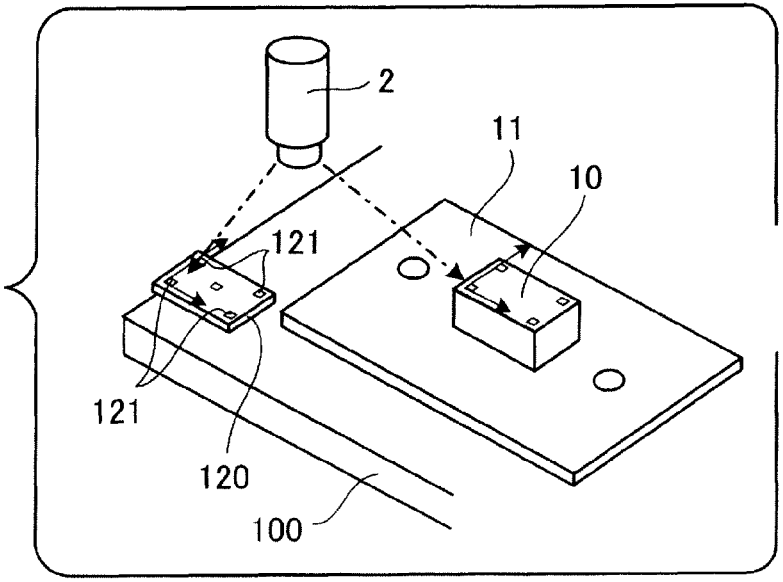

FIGS. 6A through 6C are explanatory views of various exemplary embodiments. In FIGS. 6A through 6C, the illustrations of the position and attitude recognizing unit 21, quality determining unit 20, and imaging control unit 22 illustrated in FIG. 3 are omitted because FIG. 3 will be referred to as needed.

FIG. 6A illustrates an example of the case in which the second component 11 is fixed like the first exemplary embodiment, and FIGS. 6B and 6C illustrate examples of the case in which the first component 10 is assembled in the unfixed second component 11.

In the configuration of FIG. 6A, because the second component 11 is fixed to the predetermined position like the first exemplary embodiment, the position and attitude of the first component 10 are recognized based on the position of the second component 11. On the other hand, when the second component 11 is not located in the predetermined position, the position and attitude recognizing unit 21 cannot recognize the position and attitude of the first component 10 in the configuration of FIG. 6A.

Therefore, as illustrated in FIGS. 6B and 6C, a light spot group may be provided in the second component 11 like the first component 10.

In the configuration of FIG. 6B, under the control of the imaging control unit 22, the images of LEDs 111 of the second component 11 are taken with the camera 2 in addition to the images of LEDs 101 on the top surface of the first component 10, the position and attitude recognizing unit 21 computes the position and attitude of the second component 11 in addition to the position and attitude of the first component 10, and the quality determining unit 20 determines the quality of the assembly state of the first component 10 in the second component 11 based on the position and attitude arrangement relationship between the first component 10 and the second component 11. In the configuration of FIG. 6B, because the quality of the assembly state is determined based on the relative position between the first component 10 and the second component 11, the accuracy of determination of the quality of the assembly state of the first component 10 in the second component 11 is enhanced compared with that of FIG. 6A.

In the configuration of FIG. 6C, the second component 11 is placed in a predetermined position on a component support 100. An LED board 120 is fixed to a predetermined position of the component support 100. When the LED board 120 is provided in the component support 100, the position and attitude recognizing unit 21 computes the positions and attitudes of both the component support 100 and first component 10, and the assembly state of the first component 10 in the second component 11 is determined based on the computation result. Accordingly, even if the component support 100 supporting the second component 11 is inclined, the position and attitude recognizing unit 21 recognizes the positions and attitudes of both the component support 100 and first component 10 based on the images taken with the camera 2 under the control of the imaging control unit 22, and the quality determining unit 20 accurately determines the quality of the assembly state of the first component 10 in the second component 11 supported by the component support 100.

In another exemplary embodiment, quality of an insertion state is inspected in a connector including a male connector 112P and a female connector 112S.

Figures 7A, 7B:
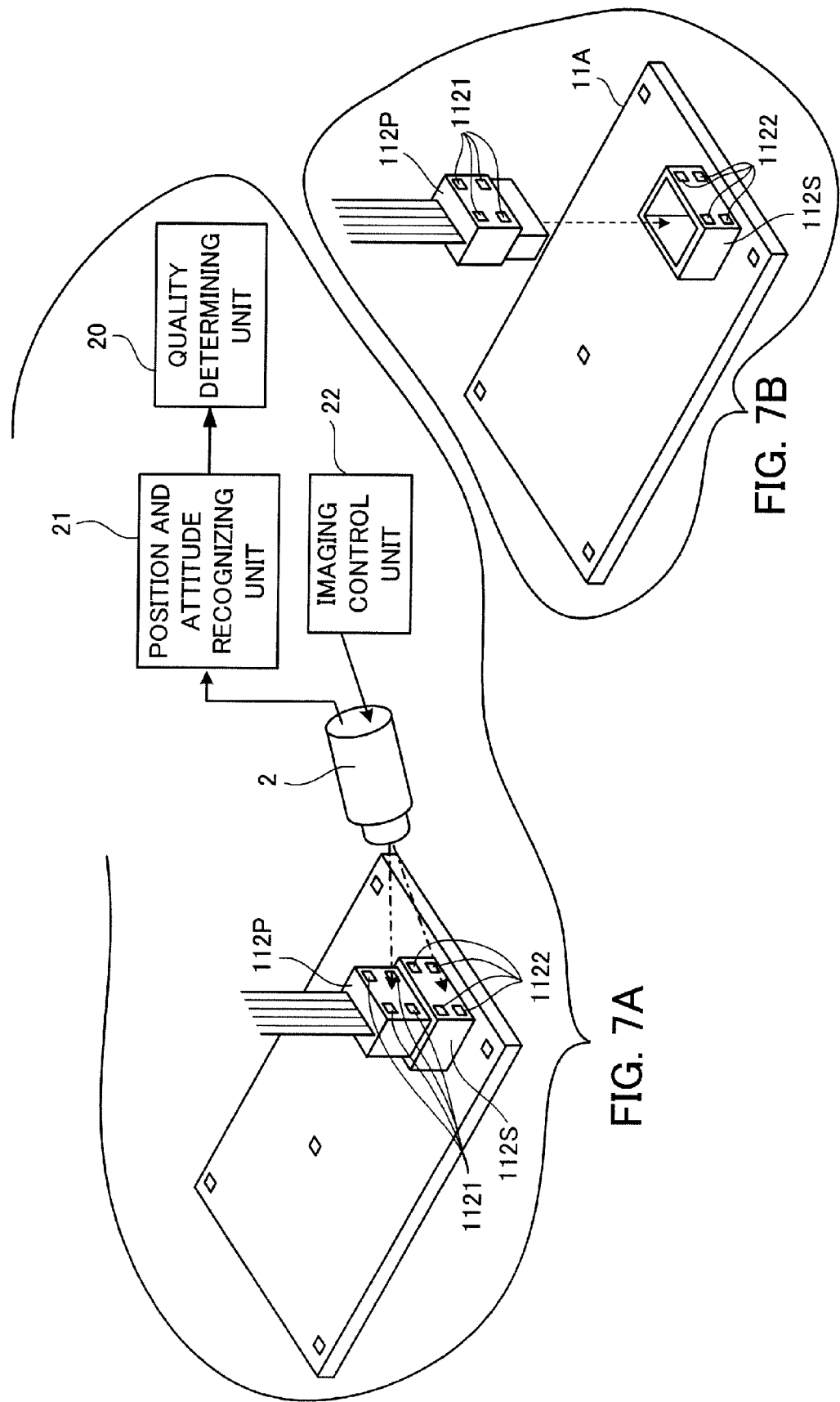
FIGS. 7A and 7B are explanatory views illustrating an exemplary embodiment in which the quality of an insertion state of a male connector into a female connector is determined.

FIGS. 7A and 7B are explanatory views illustrating a configuration in which the quality of the insertion state of the male connector in the female connector is determined using the component assembly inspection apparatus of the invention.

As illustrated in FIGS. 7A and 7B, plural LEDs 1121 and plural LEDs 1122 are provided in a male connector 112P and a female connector 112S, respectively. The camera 2 is fixed to the position in which the camera can take images of the LEDs 1121 and 1122. The imaging control unit 22 controls the camera 2, and LED light image taken with the camera 2 is fed into the position and attitude recognizing unit 21.

In the configuration of FIGS. 7A and 7B, the camera 2 takes the images of both the LEDs 1121 of the male connector 112P and the LEDs 1122 of the female connector 112S after the male connector 112P is inserted into the female connector 112S, the position and attitude recognizing unit 21 obtains the positions and attitudes of the connectors 112P and 112S based on the images taken with the camera 2, and the quality determining unit 20 determines the quality of the insertion state of the male connector 112P in the female connector 112S.

In the above-described measuring methods, although the direction of each LED 121 viewed from the camera 2 is measured with significantly high accuracy, the accuracy of a distance between the camera 2 and each LED 121 is lower than the accuracy of the direction.

Therefore, another LED 122 may be added to improve resolution of the distance, as described below.

Figure 8:
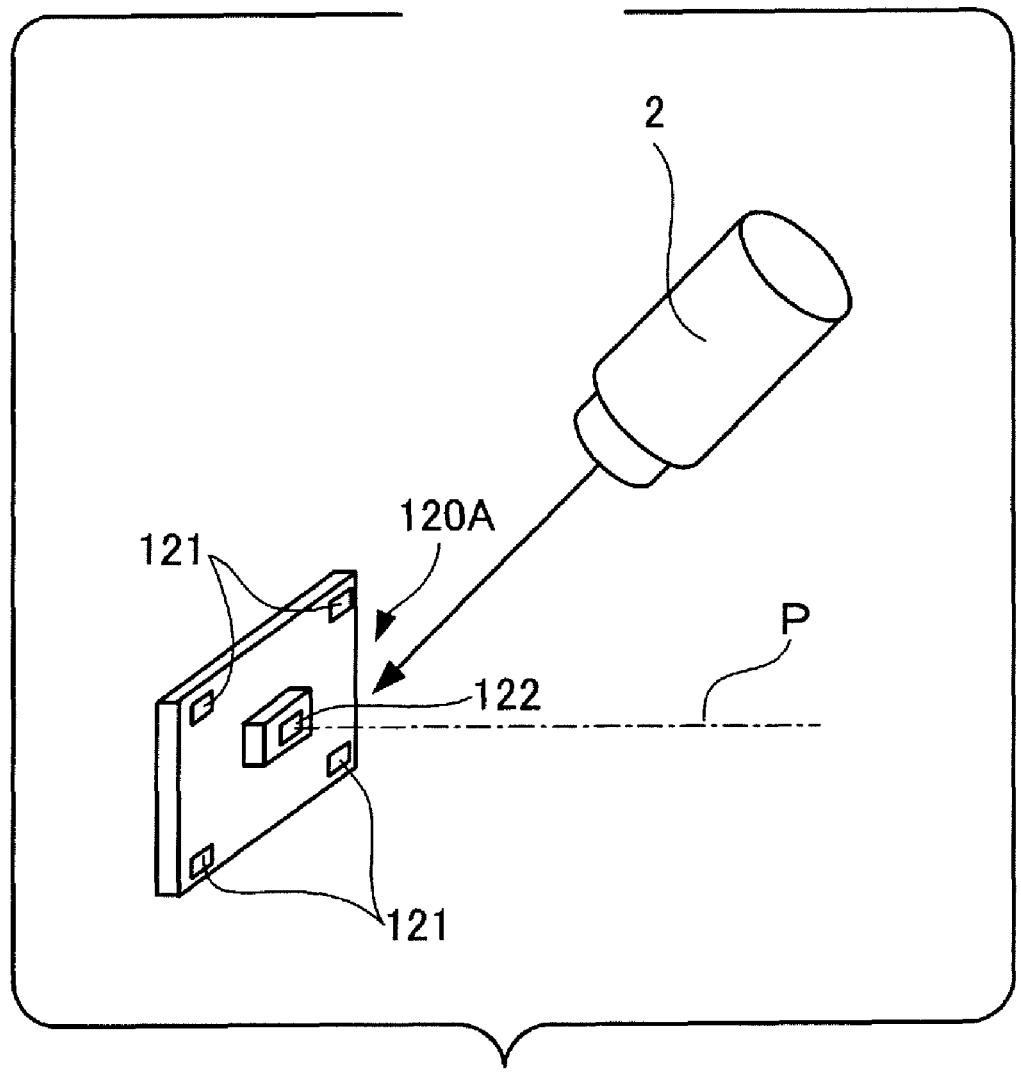
FIG. 8 is an explanatory view illustrating a novel measuring method in which accuracy of measurement is enhanced.

FIG. 8 is an explanatory view illustrating a novel measuring method in which the accuracy of measurement is enhanced.

An LED board 120A and the camera 2 are illustrated in FIG. 8.

The four LEDs 121 are disposed on the surface of an LED board 120A while separated from one another, and one LED 122 is disposed slightly above the surface of the LED board 120A. The positions where five LEDs 121 and 122 are disposed are known.

At this point, three of the four LEDs 121 disposed on the surface of the LED board 120A are used to define the position and attitude of a triangular reference plane (that is, in this case, the triangular surface overlapped with the surface of the LED board 120A) having the vertexes of three LEDs 121. The position of the remaining LED 121 disposed on the surface of the LED board 120A is differentiated from those on other LED boards 120A. The remaining LED 121 has an ID (Identification) function of distinguishing the LED board 120A from other LED boards 120A to indentify the LED board 120A. The ID function is given to the remaining LED 121 and besides this, all the four LEDs 121 are used to recognize the positions and attitude of the LED board 120A, which allows the accuracy of recognition to be enhanced.

Another LED 122 is disposed while perpendicularly separated from the reference plane (at this point, the reference plane is overlapped with the surface of the LED board 120A).

In FIG. 8, the camera 2 is disposed in a posture, in which the camera 2 is orientated toward the reference plane from a position where an imaging optical axis is not matched with a perpendicular P passing through the LED 122 to the surface (the triangular reference plane formed by three LEDs 121) of the LED board 120A. When the images of the LEDs 121 and 122 are taken with the camera 2 while the camera 2 is disposed at the position where the imaging optical axis is not matched with the perpendicular P, a difference in relative position on the imaging screen between LEDs 121 on the surface of the LED board 120A and one LED 122 located slightly above the surface of the LED board 120A is varied according to the imaging direction.

Thus, the novel measuring method may be adopted in addition to the conventional measuring methods. In the novel measuring method, the position and attitude of the reference plane, that is, the position and attitude of the LED board 120A of FIG. 8 can be measured with accuracy higher than that of the conventional measuring methods by utilizing the difference in relative position on the imaging screen between the LEDs 121 and the LED 122. The novel measuring method of FIG. 8 may be adopted in any exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A component assembly inspection apparatus comprising a non-transitory computer readable medium including a program and a computer executable program code, the apparatus comprising:
   a camera;
   an imaging control unit that causes the camera to take an image of a first light spot group possessed by a first component after the first component is assembled in a second component, the first light spot group including a plurality of light spots;
   a position and attitude recognizing unit that recognizes a position and an attitude of the first component based on a light image that is on the image taken with the camera and represents each of the light spots of the first light spot group;
   a quality determining unit that determines quality of an assembly state of the first component in the second component based on the position and attitude of the first component recognized by the position and attitude recognizing unit,
   wherein the first light spot group is a light spot group including three first light spots disposed at positions separated from one another and one second light spot disposed at a position perpendicularly separated from a triangular reference plane having the three first light spots as vertexes, and
   the imaging control unit takes the image of the first light spot group possessed by the first component with the camera disposed at a position where an imaging optical axis is not matched with a perpendicular to the reference plane, the perpendicular passing through the second light spot when the first component is correctly assembled in the second component.

2. The component assembly inspection apparatus according to claim 1, wherein the second component or a component support at a predetermined position of which the second component is fixed includes a second light spot group that includes a plurality of light spots,
   the imaging control unit takes the image of the first light spot group and an image of the second light spot group with the camera,
   the position and attitude recognizing unit recognizes the position and attitude of the first component based on the light image appearing on the image taken with the camera and representing each of the light spots of the first light spot group, and also recognizes a position and attitude of the second component or component support based on a light image appearing on the image taken with the camera and representing each of the light spots of the second light spot group, and
   the quality determining unit determines the quality of the assembly state of the first component in the second component based on both the recognized position and attitude of the first component and the recognized position and attitude of the second component or component support.

3. The component assembly inspection apparatus according to claim 2, wherein the light spot is a light emitting diode.

4. The component assembly inspection apparatus according to claim 2, wherein the light spot is a retroreflector that reflects incident light opposite to the incident direction.

5. The component assembly inspection apparatus according to claim 1, wherein the second component or a component support at a predetermined position of which the second component is fixed includes a second light spot group that includes a plurality of light spots,
   the imaging control unit takes the image of the first light spot group and an image of the second light spot group with the camera,
   the position and attitude recognizing unit recognizes the position and attitude of the first component based on the light image appearing on the image taken with the camera and representing each of the light spots of the first light spot group, and also recognizes a position and attitude of the second component or component support based on a light image appearing on the image taken with the camera and representing each of the light spots of the second light spot group, and
   the quality determining unit determines the quality of the assembly state of the first component in the second component based on both the recognized position and attitude of the first component and the recognized position and attitude of the second component or component support.

6. The component assembly inspection apparatus according to claim 5, wherein the light spot is a light emitting diode.

7. The component assembly inspection apparatus according to claim 5, wherein the light spot is a retroreflector that reflects incident light opposite to the incident direction.

8. The component assembly inspection apparatus according to claim 1, wherein the light spot is a light emitting diode.

9. The component assembly inspection apparatus according to claim 1, wherein the light spot is a light emitting diode.

10. The component assembly inspection apparatus according to claim 1, wherein the light spot is a retroreflector that reflects incident light opposite to the incident direction.

11. The component assembly inspection apparatus according to claim 1, wherein the light spot is a retroreflector that reflects incident light opposite to the incident direction.

* * * * *